United States Patent Office 2,884,662
Patented May 5, 1959

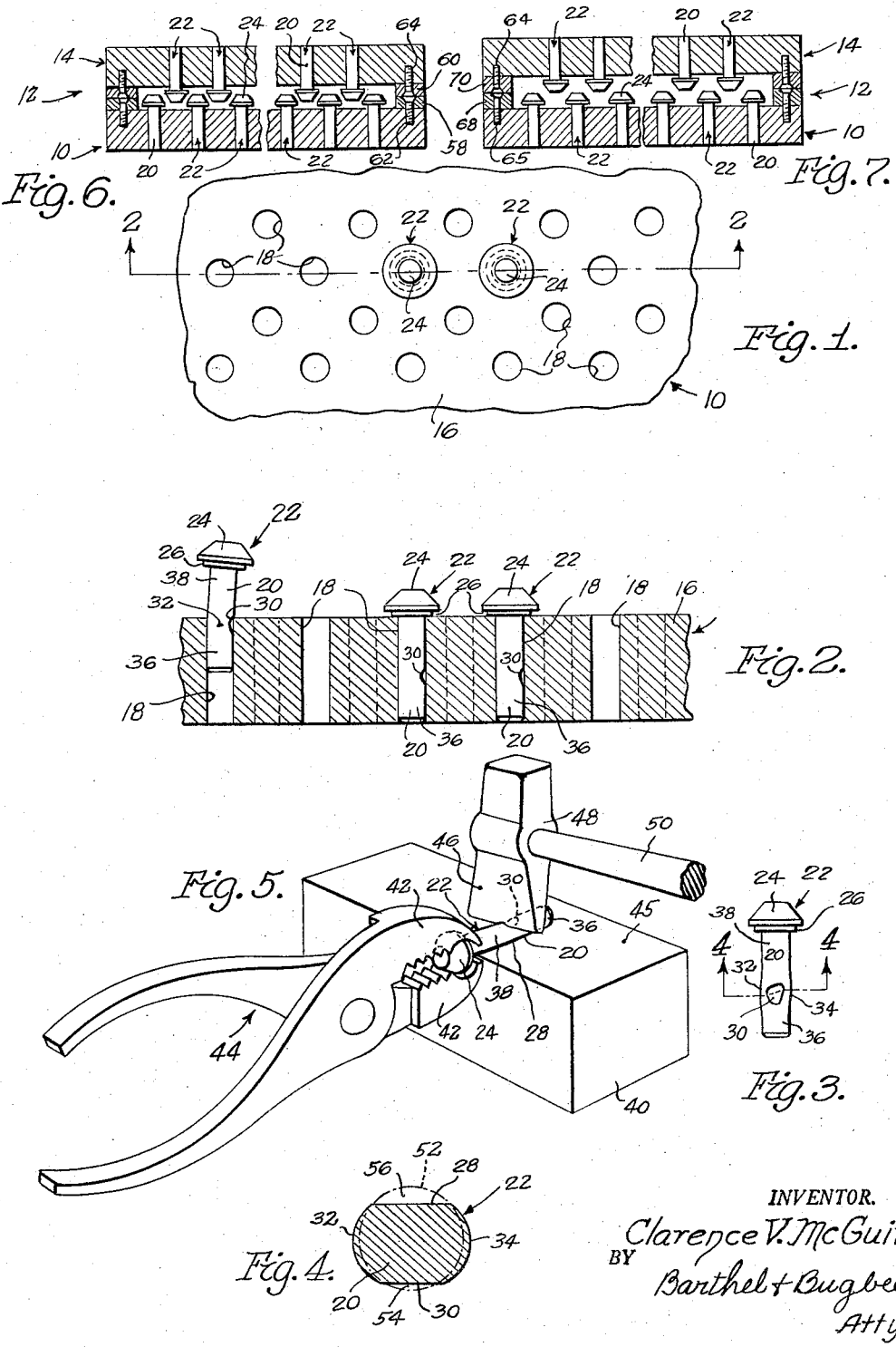

2,884,662

MOLD AND PROCESS OF MAKING THE SAME

Clarence V. McGuire, Grosse Pointe, Mich.; Frances Scott, administratrix of the estate of said McGuire, deceased Application July 19, 1954, Serial No. 444,176

2 Claims. (Cl. 18—42)

This invention relates to molds and mold making processes, and, in particular, to molds and processes for molding indented or cellular sheet rubber.

One object of this invention is to provide a mold and process of making the same for molding indented or cellular sheet rubber or other molded material which will be free from the buckling of the mold plates commonly occurring in molding such cellular sheets by reason of the fact that such mold plates are provided with headed multiple pins driven into holes in the mold plates, the exposed heads of these pins forming the cells in the rubber sheets during the molding operation, the buckling of the plates arising because the "drive" fit imparted to each pin strains the metal sufficiently to cause warping thereof.

Another object is to provide a mold and process of making the same, according to the preceding object wherein the cell-forming pins of the mold have shanks of distorted or deformed cross-section which are driven into regularly-drilled holes of circular cross-section, the clearance thereby provided between the circular hole and the non-circular pin shank giving a compensation for the buckling previously occurring as well as enabling the pins to be maintained in their holes with a sufficiently snug fit to prevent them from pulling out when the mold halves are parted after molding has been completed.

Another object is to provide a mold for molding indented or cellular sheet material wherein provision is made for enabling the thickness of the molded sheet to be varied quickly and easily without permanently altering the character of the mold halves themselves.

Other objects and advantages of the invention will become apparent during the course of the following description of the accompanying drawings, wherein:

Figure 1 is a top plan view of a partially completed mold half for molding indented or cellular sheet material, with two cell-forming pins inserted in holes;

Figure 2 is a vertical section taken along the line 2—2 in Figure 1, showing a third pin partly inserted;

Figure 3 is a side elevation of one of the cell-forming pins, showing its deformed shank;

Figure 4 is an enlarged horizontal section taken along the line 4—4 in Figure 3;

Figure 5 is a perspective view showing the manner of deforming the shanks of the cell-forming pins of Figures 3 and 4;

Figure 6 is a central vertical section, similar to Figure 2, but on a reduced scale, with the central portion of the mold plates or mold halves omitted, showing one provision for molding thin cellular sheet material; and Figure 7 is a view similar to Figure 6, but showing the same mold halves rearranged for molding thicker cellular sheet material.

Hitherto, in making cellular sheet material of rubber or other suitable material such as is shown in the McGuire Patent No. 2,503,164, of April 4, 1950, for Pneumatic Cellular Structure, it has been customary to form the air cells in the rubber sheets by means of the suitably-shaped heads of pins, the shanks of which have been driven into holes in the plates. Formerly, several thousand of these holes were drilled in the mold halves or plates, and pins having regularly-shaped cylindrical shanks of circular cross-section driven into these holes with a so-called drive fit. The drive fit was necessary in order to prevent the pins from pulling away from the plates when the mold halves or plates were separated at the conclusion of the molding operation. The force with which the pins were driven into these holes, however, set up strains in the plate which eventually resulted in warping or buckling of the plates.

This warping or buckling was corrected by hammering operations upon the plate between the holes and pins thereof. Such hammering, however, while correcting the warping or distortion of the plates, added a new defect of enlarging the spacing of the holes, so that all holes were not in their original locations. As a consequence, the upper and lower pin heads of the upper and lower mold halves were displaced from their original locations, and the air cells in the resulting sheet frequently had walls which were too thin on one side and too thick on other sides. Such walls of irregular thickness give inferior performance in the usual use of such sheets as inner soles for shoes.

The present invention solves these difficulties by preventing the deformation or warping of the plates while at the same time maintaining a constant spacing between pins. This it does by using a slightly smaller diameter shank than required for a drive into a hole of given diameter, deforming the shank of the pin prior to driving it into the hole. Deformation of the shank gives it a resilience and a springing action which holds the pin firmly in its socket without buckling, warping or otherwise deforming the plate.

Referring to the drawings in detail, Figures 1 and 2 show a mold half, generally designated 10, comprising the lower half of a pair of mold halves collectively designated 12 (Figures 6 and 7), the upper mold half 14 being substantially an inverted duplicate of the lower half. Consequently, a single description will suffice for both. The mold half 10 is constructed from a plate 16 of steel or other suitable metal, provided with a multiplicity of regularly-spaced holes 18 of substantially cylindrical shape. Driven into the holes 18, which are consequently of substantially circular cross-section, are the deformed shanks 20 of cell-forming pins, generally designated 22.

Each cell-forming pin 22 has an enlarged frusto-conical head 24 upon its shank 20, the head 24 having a reduced diameter intermediate spacing portion 26 between it and the shank 20. The shank 20 is originally of cylindrical form of slightly smaller diameter than the hole 18 into which it is to be inserted, and is provided with deformed areas 28, 30 on its opposite sides resulting in a bulging 32 and 34 of the shank 20 caused by the flow of the metal from the deformed areas 28 and 30. In addition, the deformation operation may also result in the lower portion 36 of the shank 20 being tilted slightly relatively to the upper portion 38, seen at the extreme left-hand side of Figure 2 and to a slight extent in Figure 5, so that the shank 20 will spring or yield in straightening out while being driven into the straight hole 18, as described below in connection with the operation of the invention.

In the operation of the invention, let it be assumed that block or anvil 40 of suitable material, such as steel, is provided (Figure 5), and that the plate 16 has been drilled with regularly-shaped multiple holes 18, as described above. Each pin 22 is grasped in any suitable way, such as between the jaws 42 of a pair of pliers 44 immediately beneath the head 24 and laid upon the top 45 of the anvil 40 (Figure 5). The operator then strikes the shank 20 a sharp blow with the wedge-shaped head 46 of a hammer 48, holding the pliers in one hand and the hammer handle 50 in the other hand. The same blow which causes a deforming dent 30 in one side of the shank also causes the flattened portion 28 on the other side which rested against the top 45 of the anvil 40. At the same time, the blow upon the approximate mid-portion of the shank 20 causes the upper portion 38 to be tilted slightly relatively to the lower portion 36, as shown in Figures 2 and 5. The flattening of the pin shank 20 at the areas 30 and 28 provides the bulging effects 32 and 34 in a plane at right angles to a plane passing through the flat spots 28 and dent 30.

The pin 22, thus deformed, is now aligned with one of the holes 18 and driven into the hole by means of a hammer, arbor press or other suitable means. As the bent and deformed shank 20 is forced downwardly into the hole 18, it straightens out, and at the same time, the bulged portions 32 and 34 (Figure 4) are forced radially inward toward the normal cross-section, indicated by the dotted line 52 in Figure 4. As a consequence, the shank 20 fits the hole 18 snugly yet without setting up strain which causes buckling or warping of the plate, since the dent 30 and flat spot 28 on each pin provide clearance spaces 54 and 56 respectively between them and the side walls of the bore 18. This construction and process, by eliminating the warping of the mold plates or halves 10 and 14, also eliminates the variation in the separation of the pins 22 previously occurring.

The arrangement shown in Figures 6 and 7 provides spacing bars 58 and 60 secured to their respective mold halves 10 and 14 by fasteners 62 and 64. Where a thin cellular rubber sheet is to be molded (Figure 6), the bars 58 and 60 are relatively thin. Where, however, a thicker rubber sheet is to be molded, the bars 58 and 60 are replaced by thicker bars 68 and 70 of the same construction. Thus, without altering the fundamental construction of the mold halves or plates 10 and 14, the thickness of the cellular rubber sheet produced can be easily and inexpensively altered. Such variation in thickness is desired, for example, in manufacturing cellular rubber inner soles for women's shoes, these being necessarily thinner than those required for men's shoes.

What I claim is:

1. A mold set component for use in molding articles with multiple indentations therein, said component comprising a plate having therein a multiplicity of laterally-spaced rectilinear bores, and a multiplicity of pins having shanks shorter in length than said bores snugly fitting said bores with their free ends disposed below the adjacent surface of said plate, said pins having enlarged exposed heads on said shanks shaped to the configurations desired for said indentations, each pin between its head and its shank having an intermediate spacing portion of smaller diameter than said head but of larger diameter than said shank, each pin shank having an external surface and one of said bores having an internal surface of a configuration corresponding generally to the configuration of the external surface of the pin assigned thereto, said bore surfaces being substantially cylindrical with a substantially constant cross-sectional diameter and said pin shanks having portions disposed at obtuse angles relatively to one another within their respective bores.

2. A method of making a mold half for use in molding articles with multiple indentations therein, said method comprising forming a multiplicity of substantially rectilinear laterally-spaced bores in a plate, preparing pins with heads corresponding in shape to the shapes desired for said indentations and with substantially rectilinear shanks of resilient material of slightly lesser diameters than said bores but corresponding in shape to said bores, forming spacing portions between said shanks and heads of diameters intermediate the diameters of said shanks and heads, bending said shanks transversely out of rectilinearity intermediate their opposite ends, aligning said shanks with said bores, and applying pressure to said pins to force the thus bent shanks into said bores until said spacing portions substantially engage said plate.

References Cited in the file of this patent

UNITED STATES PATENTS

| | | |
|---|---|---|
| 2,150,259 | Woodings | Mar. 4, 1939 |
| 2,344,413 | Richards | Mar. 14, 1944 |
| 2,406,589 | Cunningham | Aug. 27, 1946 |
| 2,499,241 | Courtot | Feb. 28, 1950 |
| 2,615,202 | Talalay | Oct. 28, 1952 |
| 2,626,455 | Holm | Jan. 27, 1953 |
| 2,752,635 | Miller | July 3, 1956 |